Patented Sept. 14, 1943

2,329,472

UNITED STATES PATENT OFFICE 2,329,472

FREEZER STORAGE

Carl H. Koonz, Chicago, Ill., assignor to Industrial Patents Corporation, Chicago, Ill., a corporation of Delaware No Drawing. Application May 12, 1941,
Serial No. 393,115

11 Claims. (Cl. 99—194)

This invention relates to a process of treating food products for frozen storage and more particularly it relates to a method of pretreating hams before storing in a freezer.

The problem of preventing desiccation and contamination of foods during frozen storage has received a great deal of attention over a long period of time. Many methods have been proposed, some of which have been successful, but generally they have been either inefficient or too expensive. Film coverings have been suggested but they are not used extensively in the preservation of food during frozen storage because they are usually uneconomical unless reclaimed, are inconvenient to apply or handle, and/or difficult to retain on the coated product. Brittle products, such as resinous coatings, are unsatisfactory because they chip from the surface and permit desiccation at the exposed areas. Oily and tacky products are difficult to remove from the food. Furthermore, an organic film preparation recovered from stored food products is often contaminated with a part of the food and consequently substantially altered in composition and properties. Ice coatings on the food product are difficult to build up into thick layers because of the low viscosity. Repeated freezings are sometimes necessary if a heavy ice layer is desired. Even then on extended storage the ice layer is consumed by sublimation from the surface to replace the vapor removed from the air at the colder refrigeration source. Furthermore, ice coatings are rather brittle and subject to cracking.

It has now been found possible to coat food products for frozen storage economically so that there is no substantial desiccation of the food product. It has also been found possible to coat the food products for frozen storage so that the coating may be readily removed. By the present process it is not necessary to recover the coating for re-use nor is it required to employ expensive organic coating materials. The product is recovered in an intact form without any substantial shrinking.

The present invention in general comprises applying a thick aqueous glaze containing an inorganic bodying agent on the food product, after which the product is stored in the freezer with or without an organic impervious outer coating. The bodied glaze resists desiccation of the product during frozen storage and excludes air, or other agencies which might adversely affect the product.

The bodied aqueous glaze, usually an ice coat containing a substantial quantity of bentonite, may be produced on the ham or other food product by a number of different methods. For example, it is possible to freeze the non-coated food product substantially completely and then to coat it with a suitable glaze by dipping, wiping or spraying with an aqueous suspension of bentonite, other clay, and/or the like. The coated ham may then be stored in a freezer to form a thick impervious glaze thereon. Another variation is to partially freeze the uncoated product and then to coat the partially frozen product with a suitable aqueous suspension of an inorganic bodying agent. The coated, partially frozen product is then frozen completely by any suitable method, such as moving, cold air which is not usually feasible with uncoated products. This coating of the partially frozen product possesses particular merit because the product has sufficient rigidity to permit handling without breaking of the ice-clay coating but is not dehydrated to the extent a totally frozen product might be. Because an uncoated product must necessarily be frozen in still air in order to avoid substantial dehydration, the time for freezing by this method is usually excessively great. However, by first partially freezing the product in this relatively slow manner, then coating the product with the bodied ice glaze, it is possible to finish the freezing by more efficient and rapid methods, such as by blowing cold air with fans. Of course it is also possible to coat a non-frozen food product and then to completely freeze the coated product.

The bodied aqueous paste, such as a bentonite-water paste, can be applied in a substantial thickness even in a single coat. The coat or coats can be regulated by the character and composition of the paste, the method of application, such as dipping, spraying, wiping, or the like, and the number of coats applied. The frozen bodied aqueous glaze resists cracking, chipping, breaking and peeling and is only superficially dehydrated on extended storage in a freezer, contrary to the usual results with the simple aqueous glaze. The coating is readily removed when taken from the freezer storage by defrosting the food product and washing thoroughly with water. When frozen the coating resists shock such as might be encountered in handling the frozen food product.

The preferred inorganic material for preparing the bodied aqueous paste or dispersion is bentonite. Other colloidal clay materials, such as fuller's earth, will also function satisfactorily in the present process. Although less desirable, it is also possible to employ in place of or along with the bentonite other finely divided inorganic substances such as kieselguhr, diatomaceous earth, silica gel, chalk, carbon black, kaolin, clay and/or the like.

Although water containing an inorganic bodying agent such as bentonite alone is preferably used in preparing the bodied glaze, it is also possible to use aqueous dispersions also containing honey, sugar, molasses, gelatin, pectin, salt, casein, citric acid, glycerol, aromatic substances, essential oils, flavors, germicides, surface-active agents and/or the like. One or more bodied glaze coats of the same or different compositions may be used in precoating the food products.

Although not usually employed, it is also possile to apply an outer coating containing hydrocarbon waxes, ester waxes, natural resins, synthetic resins, natural rubber, rubber derivatives, synthetic rubber, fatty substances, casein, gelatin, or mixtures of these materials with or without other materials such as clay, plasticizers, oils, glycerol, aromatic substances, flavors, essential oils, germicides, wetting agents and/or the like. It is possible to apply any of the foregoing coatings in a molten condition, in solution in the solvent or dispersed in a non-solvent such as water or aqueous solutions. One or more of the resistant solid organic and/or inorganic outer coats of the same or different compositions may be applied.

Among the merits of the present method of operating are: Desiccation is minimized during the freezing treatment; the coatings may be applied easily; there is no tendency for the coating to adhere to the product so as to cause pieces of the product to be removed with the coating; and quick freezing methods, such as by moving air, may be employed.

The following examples of methods of operating are given for the purpose of illustrating the present invention, but they are not intended to be limiting on the scope thereof.

Example I

Unfrozen, cooled, green hams are coated by rapid immersion in a heavy, thick paste comprising about 12% bentonite mechanically agitated with, and dispersed in, 88% water. This operation is preferably accomplished in the freezer in which the hams are to be frozen. The hams after coating are hung by the string on the shank end on hooks conveniently arranged. After being frozen, the hams are placed in freezer storage bins for an extended period. There is substantially no dessication during freezing or storing. The frozen ham can withstand rigorous handling without injury to the continuous film.

Example II

The uncovered green or cured hams with the customary string on the shank end are placed on hooks or rods in a still air freezer at a temperature of about 0° to —5° F. The product is permitted to remain in the freezer until about ¼ of an inch of the outer part of the ham is frozen hard. The ham is then glazed by moving a dip pot containing a cold water dispersion of 10% bentonite up around the ham so as to completely submerge the ham without removing it from the hanging position. The dip pot is lowered and the ham is permitted to hang until completely frozen. After the coating, the freezing of the hams may be expedited by employing fans for circulating the cold air. The hams are then usually removed from the hanging position and piled in storage bins until they are needed for use.

Example III

A green ham is hung in a still air freezer at a temperature of about 0° to —5° F., where it is permitted to remain until it is completely frozen. It is then dipped or sprayed with a cold water dispersion of 12% bentonite so as to completely coat the surface with a bodied ice glaze. After a few minutes of further hanging in the freezer at the low temperature so that the bodied ice coat will set, the hams are removed and stored in freezer storage bins. Because of the heavy, impervious coating on the exterior of the hams, there is no contamination or deterioration of the hams by the surrounding air.

Although the above examples are all directed to the use of a 10% to 12% bentonite dispersion, it is possible to use other proportions ranging from a fraction of a percent up to 15-20% or higher of this and/or other inorganic bodying agents.

The process is particularly suited for treating hams but it is also applicable to other cuts of meats, fruits, vegetables, cheese and/or the like. In fact, the coating may be applied to any material, edible or not, which is to be frozen and/or held in frozen storage.

Obviously many modifications and variations of the invention hereinbefore set forth may be made without departing from the spirit and scope thereof, and therefore, only such limitations should be imposed as are indicated in the appended claims.

I claim:

1. The process of preparing hams for freezer storage which comprises immersing a partially frozen ham in a 12% aqueous bentonite suspension, removing the immersed partially frozen ham, and freezing the retained aqueous suspension on the surface of the ham as a resistant heavy glaze.

2. The process of preparing hams for freezer storage which comprises coating the ham with a 10-15% aqueous bentonite suspension and freezing the aqueous suspension on the surface of the ham as a glaze.

3. In the process of storing food products, the step of freezing an aqueous glaze on the surface of the product, said aqueous glaze containing a substance selected from the group consisting of bentonite, fuller's earth, kieselguhr, diatomaceous earth, silicia gel, chalk, carbon black, kaolin and clay.

4. In the process of preparing food products for freezer storage, the step of freezing a colloidal clay-ice glaze on the surface of the product.

5. In the process of preparing food products for freezer storage, the step of freezing a bentonite-ice glaze on the surface of the product.

6. In the process of preparing food products for freezer storage, the step of forming an aqueous glaze containing a colloidal clay material on the food surface.

7. In the process of preparing foods for freezer storage, the steps of forming a clay-ice glaze on the food surface before it is completely frozen, and then completely freezing the product.

8. In the process of preparing foods for freezer storage, the step of forming a bentonite-ice glaze on the food surface.

9. In the process of preparing foods for freezer storage, the steps of partially freezing the food product, immersing the food product in an aqueous bentonite suspension, removing the immersed food product, and freezing the retained aqueous suspension on the surface of the food product as a glaze.

10. The process of treating food products for freezer storage which comprises forming an aqueous clay glaze on the food surface and storing the product at freezing temperatures for a substantial period of time.

11. In the process of preparing food products for freezer storage, the step of freezing a kieselguhr-ice glaze on the surface of the product.

CARL H. KOONZ.